US00RE34710E

United States Patent [19]

Fujisawa et al.

[11] E Patent Number: Re. 34,710

[45] Reissued Date of Patent: Aug. 30, 1994

[54] MAGNETO-OPTICAL RECORDING APPARATUS

[75] Inventors: Hirotoshi Fujisawa; Takashi Ohmori; Ryo Ando, all of Tokyo, Japan

[73] Assignee: Sony Corporation, Japan

[21] Appl. No.: 92,489

[22] Filed: Jul. 16, 1993

Related U.S. Patent Documents

Reissue of:

[64] Patent No.: 5,034,933
Issued: Jul. 23, 1991
Appl. No.: 482,216
Filed: Feb. 20, 1990

[30] Foreign Application Priority Data

Mar. 10, 1989 [JP] Japan ..... 1-027793[U]
Jul. 10, 1989 [JP] Japan ..... 1-081074[U]
Jul. 13, 1989 [JP] Japan ..... 1-082316[U]

[51] Int. Cl.[5] ..... G11B 11/00; G11B 23/00

[52] U.S. Cl. ..... 369/13; 369/75.2; 369/270; 360/114

[58] Field of Search ..... 369/13, 270, 271, 75.2, 369/77.2, 112, 14; 360/114, 59, 103, 66, 104, 60; 365/122

[56] References Cited

U.S. PATENT DOCUMENTS 4,509,157 4/1985 Morinaga ..... 369/75.2
4,740,937 4/1988 Watanabe ..... 369/13
4,901,303 2/1990 Kikuchi ..... 369/112
5,247,496 9/1993 Yamatani ..... 369/13

FOREIGN PATENT DOCUMENTS 58-218074 12/1983 Japan ..... 369/75.1
0067751 3/1987 Japan ..... 360/114

*Primary Examiner*—Robert J. Pascal
*Assistant Examiner*—Ali Neyzari
*Attorney, Agent, or Firm*—Charles P. Sammut

[57] ABSTRACT

A magneto-optical disc recording apparatus arranged such that the magneto-optical disc is recorded by irradiating the magneto-optical disc with a recording light beam from an optical pickup head device under the condition that the optical pickup head device is applied with an external magnetic field by external magnetic field generating means. In this magneto-optical disc recording apparatus, a spacer sheet is located on the magneto-optical disc, whereby the external magnetic field is applied to the magneto-optical disc under the condition that the external magnetic field generating means is brought in contact with the spacer sheet.

33 Claims, 7 Drawing Sheets

MAGNETO-OPTICAL RECORDING APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to a magneto-optical disc recording apparatus and, more particularly, is directed to a position control apparatus for use with a magneto-optical disc recording apparatus for controlling the position of a magnetic field coil provided as external magnetic field generating means.

2. Description of the Prior Art

Recently, in the technical field of the disc recording apparatus, a magneto-optical recording apparatus is proposed as a system which can record a magneto-optical disc.

In the magneto-optical recording apparatus, a disc in which a perpendicular magnetic recording medium is utilized as a record medium has an external magnetic field applied to it by external magnetic field generating means such as a magnetic field coil or the like. Under this condition, a laser beam is irradiated on the above-described disc to locally raise its temperature, whereby a coercive force in the portion irradiated by the laser beam is decreased to invert a magnetization by the external magnetic field, thereby a signal being recorded or erased.

A permanent magnet or a magnetic field coil may be utilized as external magnetic field generating means for applying an external magnetic field to the perpendicular magnetic recording medium of the disc. When a permanent magnet is employed as the external magnetic field generating means, an inverting mechanism for inverting the permanent magnet must be provided. There is a limit to the speed at which the magnetic field of the permanent magnet can be rapidly inverted by the inverting mechanism. Therefore, the laser beam is modulated on the basis of data to be recorded and the recording is made (this system is what might be called an optical modulation system).

Whereas, when a magnetic field coil is employed as the external magnetic field generating means, the inversion of the magnetic field can be rapidly performed by changing-over a current to be supplied to the magnetic field coil. Therefore, a current to be supplied to the magnetic field coil is modulated on the basis of data to be recorded and then the recording is carried out (this system is what might be called a magnetic field modulation system). In the magnetic field modulation system, a so-called overwrite is possible so that the time necessary for erasing unnecessary data on the disc is not required. Thus, the magneto-optical disc can be treated as a standard magnetic disc. Further, the above-mentioned inverting mechanism becomes unnecessary and there is then the advantage that the magneto-optical recording apparatus can be made compact in size.

Accordingly, in the magneto-optical disc recording apparatus utilizing the magnetic field coil provided, for example, as the external magnetic field generating means, in order to apply a sufficient external magnetic field to the disc so that a signal can be positively recorded or erased, the magnetic field coil provided as the external magnetic field generating means must be located close to the disc, and also the distance between the magnetic field coil and the disc must be controlled to become constant.

As the position control means or method for controlling the position of the magnetic field coil in this magneto-optical recording apparatus, the following methods are proposed:

(a) A stationary method . . . A magnetic field coil is fixedly located in advance relative to the disc with a spacing larger than a tolerance of its surface wobbling;

(b) A method utilizing a tire . . . A tire is provided to rotatably contact with a surface of the disc and a block including a magnetic field coil is provided on a rotation center axis of this tire (see Japanese Laid-Open Patent Gazette No. 63-206936); and (c) A method for controlling a position of a magnetic field coil by the combination of a photo sensor and an actuator. The distance from the disc to the magnetic field coil is measured by a photo sensor, and the actuator is driven by an information of the measured distance, thereby the position of magnetic field coil is controlled.

However, the prior-art position control means for controlling the position of the magnetic field coil have the following unavoidable defects:

In the stationary method (a), the distance between the magnetic field coil and the disc must be increased in order to prevent the magnetic field coil from being brought in contact with the disc when the disc is wobbled due to the warping of the disc. Consequently, a powerful magnetic field is required in order to record (or erase) a signal, which unavoidably causes the magnetic field coil to consume large amount of electric power. Therefore, this method (a) is not suitable for miniaturizing the magneto-optical disc recording apparatus or making the same as a portable one.

In the method (b) utilizing the tire, when the surface of the disc is irregular or has roughness, the tire is directly affected by the uneven surface of the disc and is thereby wobbled considerably so that the position of the magnetic field coil becomes unstable. Further, this method (b) is easily affected by an external disturbance due to the irregular surface of the disc. Furthermore, a rotary supporting mechanism for the tire needs so many assembly parts, which provides a complicated arrangement. Therefore, this method (b) is not suitable for making the magneto-optical disc recording apparatus as a portable one.

Further, in the method (c) for controlling the position of the magnetic field coil by the combination of the photo sensor and the actuator, this method is not affected by the external disturbance due to the irregular surface of the disc. However, many assembly parts such as the photo sensor, the actuator and so on are required, and also its electrical circuit becomes complicated in arrangement. This method (c) is also not suitable for making the magneto-optical recording apparatus as a portable one.

OBJECTS AND SUMMARY OF THE INVENTION

Therefore, it is an object of the present invention to provide an improved magneto-optical disc recording apparatus which can eliminate the aforementioned defects inherent in the prior art.

More specifically, it is an object of the present invention to provide a magneto-optical disc recording apparatus in which the position of a magnetic field coil provided as an external magnetic field generating means can be positively controlled by a simplified arrangement.

Another object of this invention is to provide a magneto-optical disc recording apparatus in which a magnetic coil can be located close to a magneto-optical disc as an external magnetic field generating means without damaging the magneto-optical disc.

A further object of this invention is to provide a magneto-optical disc recording apparatus which can be fully protected from being affected by concaved or convexed portions formed on the magneto-optical disc.

Yet a further object of this invention is to provide a magneto-optical disc recording apparatus in which the power consumption of the magnetic field coil can be suppressed.

Yet a further object of this invention is to provide a chucking apparatus for use with a magneto-optical disc recording apparatus in which upon releasing the chucking, the magneto-optical disc can be prevented from being recklessly ejected from the apparatus.

Still a further object of this invention is to provide a magneto-optical disc recording apparatus in which a magneto-optical disc can be ejected from a turntable and/or loaded thereto with ease by a disc tray attached to an upper lid.

Still another object of this invention is to provide a magneto-optical disc recording apparatus in which a spacer sheet and a magnetic field coil provided at the rear surface of the spacer sheet as an external magnetic field generating means can be protected.

As a first aspect of the present invention, in a magneto-optical recording apparatus in which the magneto-optical disc is recorded by irradiating a magneto-optical disc with a recording light from a optical pickup head device under the condition that the magneto-optical disc is applied with an external magnetic field by an external magnetic field generating device, the magneto-optical disc recording apparatus is comprised of a spacer sheet mounted on the magneto-optical disc wherein the external magnetic field generating device is brought in contact with the spacer sheet.

As a second aspect of the present invention, a magneto-optical recording apparatus is comprised of an apparatus body including a optical pickup head device for irradiating a magneto-optical disc with a recording light under the condition that the magneto-optical disc has applied to it an external magnetic field, a rotary drive device for rotating the magneto-optical disc, a lid including an external magnetic field generating device for applying an external magnetic field to the magneto-optical disc, a holding device for holding the magneto-optical disc together with the rotary drive device so that the magneto-optical disc can be rotated, and a position control member for controlling the position of the external magnetic field generating device so that the distance between the external magnetic field generating device and the magneto-optical disc becomes constant, the lid being rotatably attached to the apparatus body.

BRIEF DESCRIPTION OF THE DRAWINGS

A better understanding of the objects, features and advantages of the invention can be gained from a consideration of the following detailed description of the preferred embodiments thereof, in conjunction with the figures of the accompanying drawings, wherein.

DETAILED DESCRIPTION OF PREFERRED EMBODIMENTS

Figure 1:
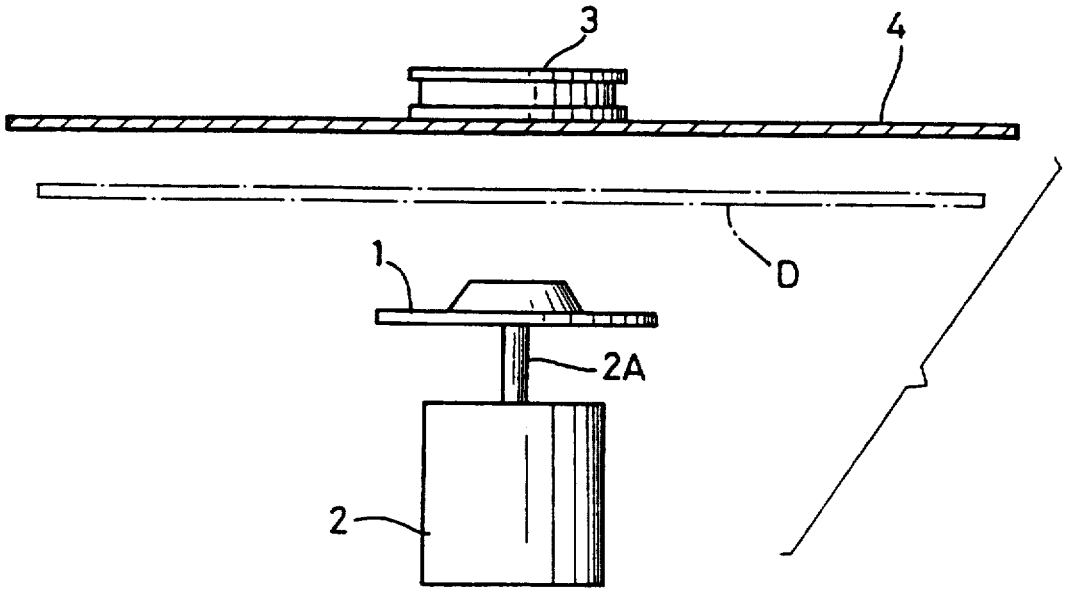
FIG. 1 is a side view of one portion of a first embodiment of the magneto-optical disc recording apparatus according to the present invention.
Figure 2:
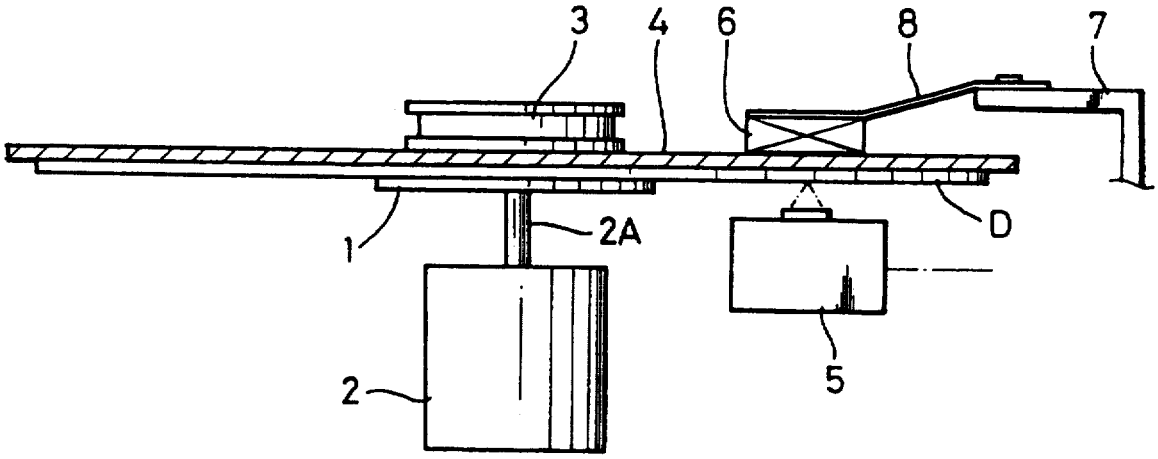
FIG. 2 is a side view illustrating an overall arrangement of the magneto-optical disc recording apparatus of this invention.
Figure 3:
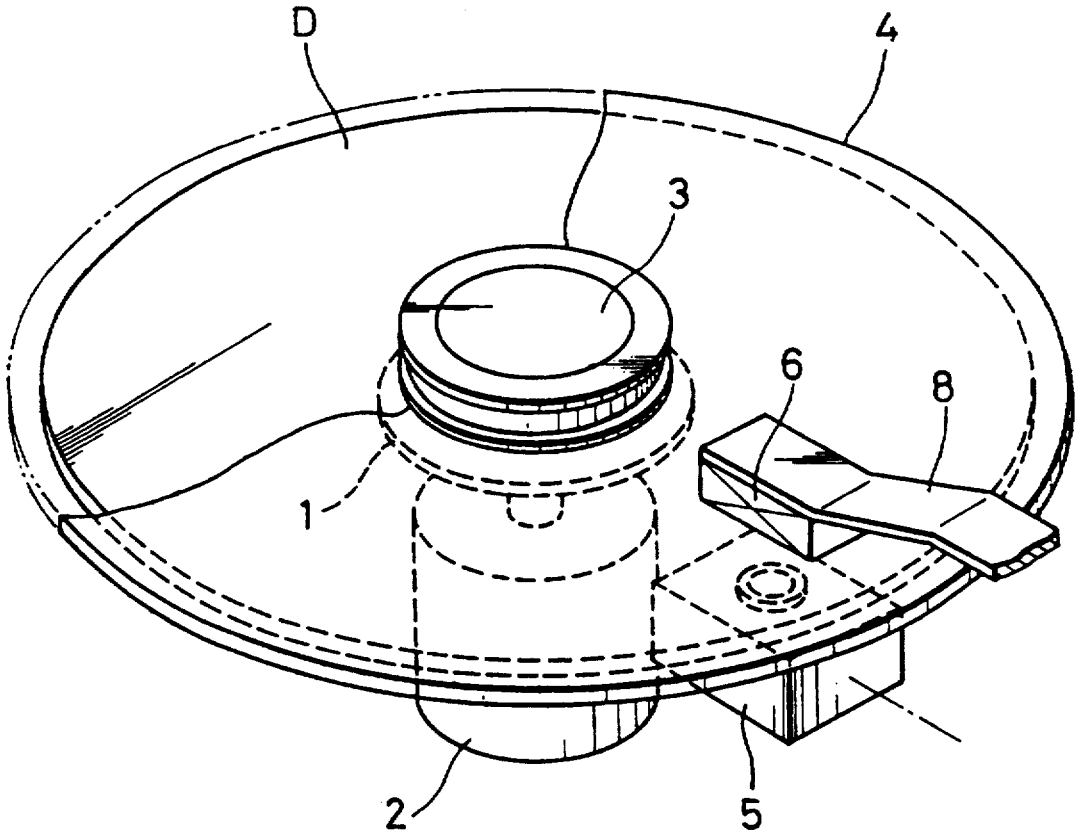
FIG. 3 is a schematic perspective view of the magneto-optical disc recording apparatus of this invention.

Referring to the drawings in detail, the present invention will be described. Referring initially to FIGS. 1 to 3, a first embodiment of the magneto-optical disc recording apparatus according to the present invention will be explained.

As shown in FIGS. 1 to 3, a turntable 1 is attached to a drive shaft 2A of a spindle motor 2, and a chucking plate 3 is located above the turntable 1 in an opposing relation thereto. The chucking plate 3 is rotatably supported to a stationary portion (not shown) and incorporates therein a magnet (not shown) so that, when a magneto-optical disc (hereinafter simply referred to as a disc) D is inserted into the magneto-optical disc recording apparatus, the chucking plate 3 magnetically attracts the turntable 1, whereby the disc D is chucked therebetween and hence the disc D is rotated by the spindle motor 2.

In the above-described chucking mechanism, a disc-shaped spacer sheet 4 of a size bigger than the disc D is stuck to the lower surface of the chucking plate 3 so that, when the disc D is chucked by the chucking mechanism, this spacer sheet 4 is mounted on the upper surface of the disc D and thereby the disc D and the spacer sheet 4 are rotated together. The spacer sheet 4 is made of such a material which is light in weight, flexible and smooth in surface so as to closely contact with the disc D well.

Referring, for example, to FIG. 2, a optical pickup head device 5 is provided to emit a laser beam which is then focused on the vertical magnetic record medium surface of the disc D by an objective lens (not shown). A magnetic field coil 6 is located above the disc D in an opposing relation to the optical pickup head device 5 through the spacer sheet 4 as external magnetic field generating means. When this magnetic field coil 6 is conducted and driven, the magnetic field coil 6 supplies an external magnetic field to the perpendicular record medium surface of the disc D, whereby the magnetization is inverted in the perpendicular magnetic record medium surface at its portion irradiated by the laser beam, and thus a signal is recorded.

The magnetic field coil 6 is brought in mechanical contact with the spacer sheet 4 under the condition that the disc D is chucked and that the spacer sheet 4 is mounted on the top surface of the disc D. More specifically, the magnetic field coil 6 is resiliently attached to a stationary side link mechanism 7 via a leaf plate spring 8, whereby the magnetic field coil 6 is urged against the upper surface of the spacer sheet 4 by a predetermined pressure by the resilient pushing force of the leaf plate spring 8. In that case, it is preferable that the lower surface of the magnetic field coil 6, i.e., the contact surface thereof in which the magnetic field coil 6 contacts with the spacer sheet 4 is treated by a so-called smoothing coating-process.

As is clear from the above-described arrangement, in the magneto-optical disc recording apparatus of this embodiment, when the disc D is chucked, the spacer sheet 4 closely contacts with the upper surface of the disc D so that, regardless of the bending, distortion or the like of the disc D, the spacer sheet 4 can bend along the disc D. Under this state, the magnetic field coil 6 is pushed against the top surface of the spacer sheet 4 by the spring-biasing force of the leaf plate spring 8, whereby the spacing between the disc D and the magnetic field coil 6 is determined by the thickness of the spacer sheet 4. Therefore, the magnetic field coil 6 can smoothly follow the so-called disc surface wobbling caused by the rotation of the disc D. Accordingly, the position of the magnetic field coil 6 relative to the disc D is always kept constant so that the magnetic field coil 6 applies a stable external magnetic field to the perpendicular record medium surface of the disc D, and the magneto-optical recording is performed positively.

Although the magnetic field coil 6 is incessantly urged against the spacer sheet 4 with a friction which is unitarily rotated with the disc D, the flatness of the surface of the spacer sheet 4 is excellent and the contact surface of the magnetic field coil 6 is treated by the smoothing coating-process so that the smoothing property between the contact surface of the magnetic field coil 6 and the spacer sheet 4 becomes excellent. Therefore, the magnetic field coil 6 can be given a sufficient wear-proof property.

The magneto-optical disc recording apparatus of the first embodiment brings about various sorts of advantages which will be explained below.

In this embodiment of the magneto-optical disc recording apparatus, the spacer sheet 4 is interposed between the magnetic field coil 6 and the disc D, that is, the magnetic field coil 6 is opposed to the disc D through the spacer sheet 4 so that the disc D can be prevented from being damaged by the magnetic field coil 6. Further, even when the top surface of the disc D is irregular or given roughness, the magnetic field coil 6 can be prevented from being directly affected by the concaved and convexed surface or roughness of the disc D, and can smoothly follow the disc D along the spacer sheet 4. Therefore, the position of the magnetic field coil 6 is stabilized and can be prevented from being affected by an external disturbance due to the concaved and convexed surface or the like of the disc D as much as possible.

The magnetic field coil 6 is constantly located close to the disc D so that, even when the magnetic field coil 6 does not generate a powerful magnetic field by a large electric power, it can apply a sufficient external magnetic field to the perpendicular record medium surface of the disc D. Therefore, the power consumption of the magnetic field coil 6 can be suppressed.

The magneto-optical disc recording apparatus of this embodiment is provided with a position control mechanism for controlling the position of the magnetic field coil 6 as described above. This position control mechanism has a very simplified construction wherein the spacer sheet 4 is mounted on the disc D and the magnetic field coil 6 contacts with the upper surface of the spacer sheet 4. Therefore, the position control mechanism can be constructed by fewer assembly parts and the overall arrangement thereof can be made compact in size. In addition, only a pushing force by which the magnetic field coil 6 is pushed toward the spacer sheet 4, that is, the resiliency of the leaf plate spring 8 must be adjusted, which fact reduces portions to be adjusted and also removes a cumbersome adjusting process.

Owing to the aforementioned various advantages of this embodiment of the present invention, the conditions necessary for miniaturizing the magneto-optical disc recording apparatus can be satisfied. The present invention therefore makes an important contribution to realizing a magneto-optical disc recording apparatus of compact type.

In the disc chucking device of the first embodiment of the invention in which the spacer sheet 4 is unitarily attached to the chucking plate 3, there is presented the substantial possibility that, when the chucking plate 3 is lifted in the chucking releasing operation, there is the possibility that the disc D is also lifted together with the spacer sheet 4, so that the disc D is ejected from the turntable 1. This can happen because, upon chucking, the spacer sheet 4 is pushed to closely contact with the top surface of the disc D so that the spacer sheet 4 and the disc D are caused to be stuck to each other by a so-called atmospheric pressure.

The second embodiment of the invention can remove the aforementioned shortcoming, and let us describe the second embodiment in detail with reference to FIGS. 4 to 7.

Figure 4:
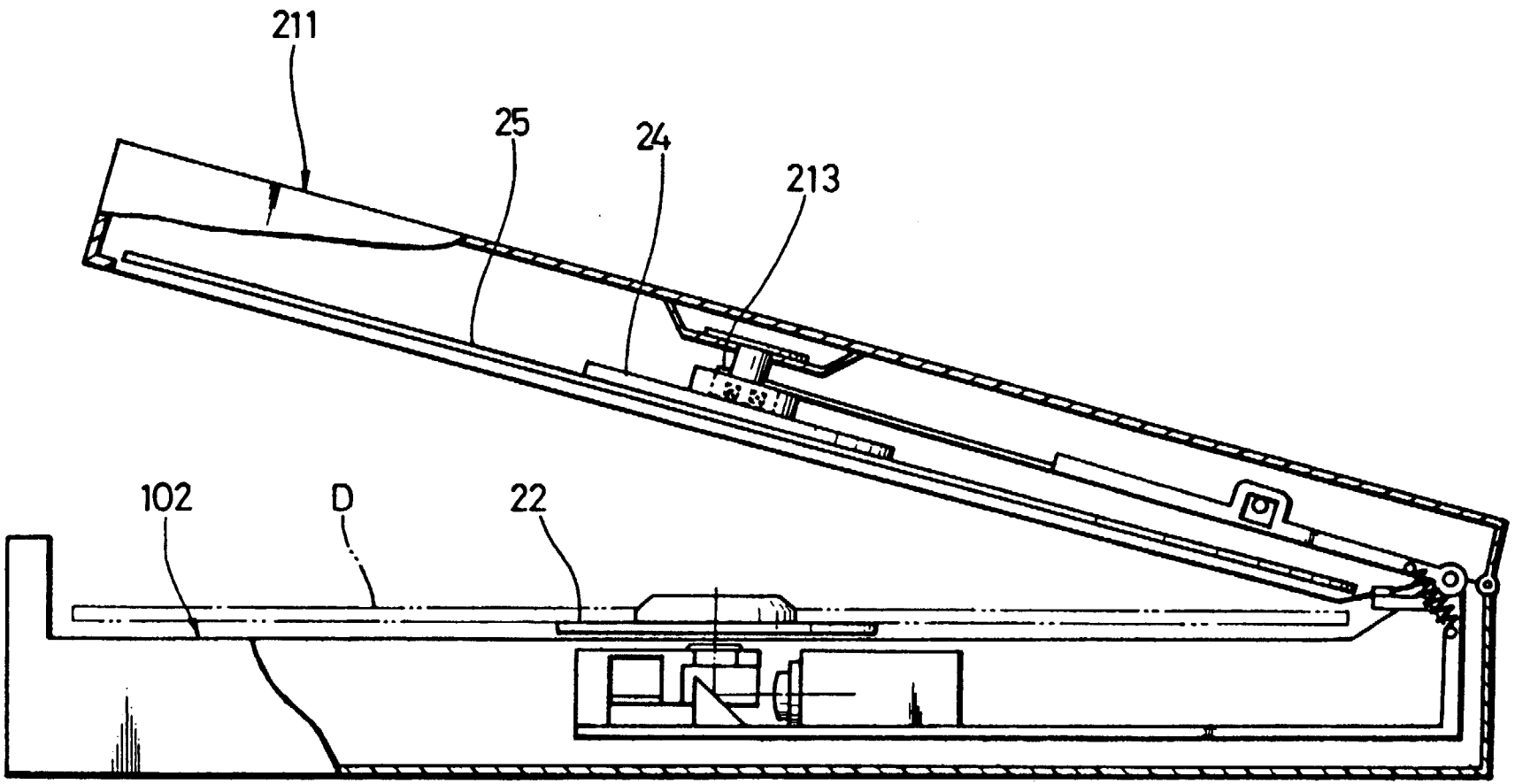
FIG. 4 is a diagrammatic view of a vertical section illustrating an overall arrangement of a second embodiment of the magneto-optical disc recording apparatus according to the present invention.

FIG. 4 shows an overall arrangement of the second embodiment of the magneto-optical disc recording apparatus according to the present invention, and illustrating a layout of respective elements which will be explained hereinunder.

In FIG. 4, it will be seen that an openable and/or closable upper lid 211 is attached to an apparatus body 102 in which a turntable 22 is mounted. A chucking plate 24 for chucking the disc D is secured to the upper lid 211, and a spacer sheet 25 is attached to the chucking plate 24 for controlling the position of a magnetic field coil. Thus, when the upper lid 211 is opened to load the disc D on the turntable 22 and the upper lid 211 is then closed, the disc D is chucked (attached by means of chucking) on the turntable 22 by the chucking plate 24, and the spacer sheet 25 attached to the chucking plate 24 comes in close contact with the upper surface of the disc D. Under this condition, a magnetic field coil 213 contacts with the surface of the spacer sheet 25, thereby controlling a spacing between the magnetic field coil 213 and the disc D to become constant.

Figure 5:
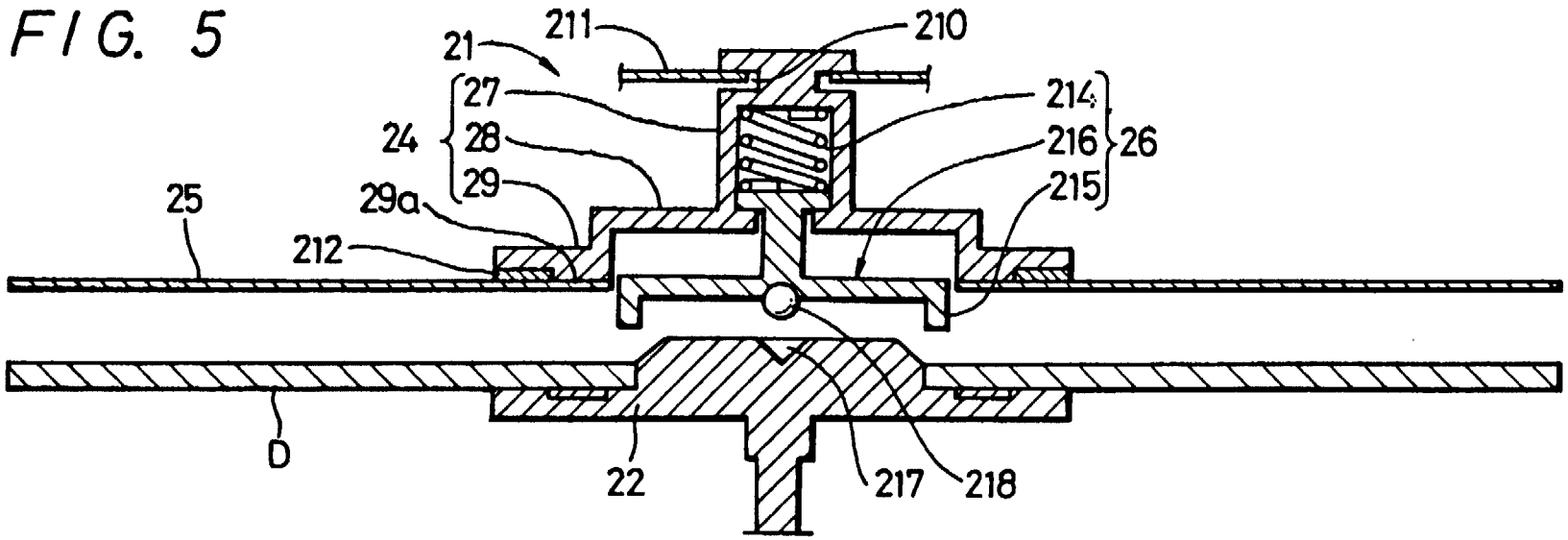
FIG. 5 is a diagrammatic view of a vertical section of the second embodiment of the magneto-optical disc recording apparatus according to this invention, and to which reference will be made in explaining the condition that a disc chucking apparatus is not actuated.
Figure 6:
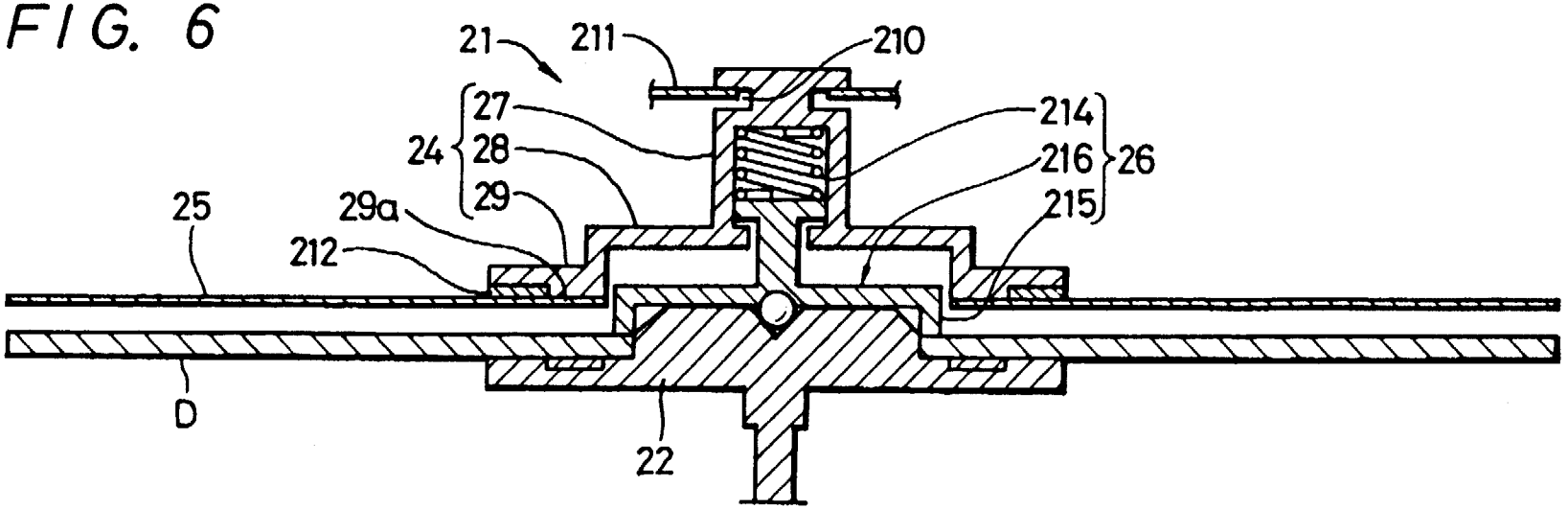
FIG. 6 is a diagrammatic view of a vertical section of the second embodiment of the magneto-optical disc recording apparatus according to this invention, and to which reference will be made in explaining an action of a disc pushing mechanism.
Figure 7:
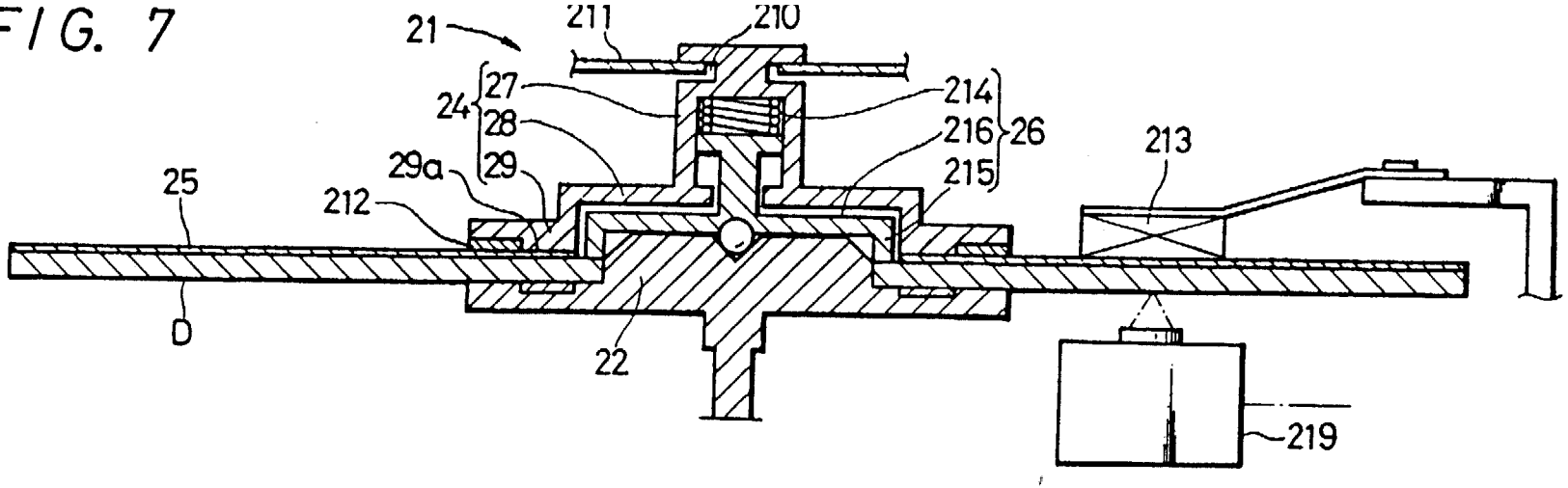
FIG. 7 is a diagrammatic view of a vertical section of the magneto-optical disc recording apparatus, and to which reference will be made in explaining the condition that the disc chucking operation is finished.

Referring to FIGS. 5, 6 and 7, there is provided a disc chucking device 21 that is utilized in the second embodiment of the magneto-optical disc recording apparatus. The disc chucking device 21 is located above the turntable 22 and is composed of the chucking plate 24 and the spacer sheet 25. The chucking plate 24 is adapted to chuck the disc D set on the turntable 22 or to release the disc D from being chucked by moving itself closer to or by moving itself apart from the turntable 22. The spacer sheet 25 is attached to the chucking plate 24 and is brought in close contact with the top surface of the disc D upon chucking. The chucking plate 24 is provided with a disc pushing mechanism 26 which will be described more fully later.

The turntable 22 is made of a magnetic material such as a metal or the like, and is rotated by a spindle motor (not shown).

The chucking plate 24 is comprised of a small-diameter cylinder portion 27 of a so-called cylinder type with a lid whose upper end is closed, a middle-diameter cylindrical portion 28 coaxially communicated with the cylinder portion 27 at its lower opening portion and a large-diameter flange portion 29 coaxially communicated with the middle-diameter cylinder portion 28 at its lower opening portion. An annular-shaped concave groove 210 is formed on the outer peripheral surface of the upper end portion of the small-diameter cylindrical portion 27. Thus, when one portion of the upper lid 211 of the magneto-optical disc recording apparatus is engaged with the concave groove 210 with clearance, the chucking plate 24 is rotatably attached to the upper lid 211.

When the upper lid 211 is closed from the opened state, the large-diameter flange portion 29 approaches the turntable 22 side, whereby an attracted surface 29a of the large-diameter flange portion 29 is attracted to the turntable 22 by the magnetic force of a magnet 212 attached to the underside of the flange portion 29. Therefore, the disc D is chucked to the turntable D at an inner peripheral portion thereof between the attracted surface 29a of the flange portion 29 and the turntable 22.

The spacer sheet 25 is formed as a disc-shaped sheet of a diameter larger than that of the disc D and having a predetermined thickness by molding a light-weight, smooth non-magnetic plastic material having a small friction coefficient. Further, the spacer sheet 25 has a sufficient flexibility that it can closely contact with the top surface of the disc D well. This spacer sheet 25 is unitarily stuck to the attracted surface 29a of the flange portion 29.

When the attracted surface 29a of the flange portion 29 is stuck to the turntable 22 side, as shown in FIG. 7, the spacer sheet 25 closely contacts with the upper surface of the disc D chucked to the turntable 22. Accordingly, if the magnetic field coil 213 contacts with the upper surface of the spacer sheet 25, then the spacing between the magnetic field coil 213 and the disc D is naturally controlled to be determined as the thickness of the spacer sheet 25.

The disc pushing mechanism 26 is comprised of a movable member pushing coil spring 214 secured within the small-diameter cylindrical portion 27 of the chucking plate 24 and a movable member 216 which has one end spring-biased by the coil spring 214 and another end, i.e., an annular-shaped disc pushing portion 215 projected from the lower opening portion of the middle-diameter cylindrical portion 28 to push against the innermost peripheral portion of the disc D.

The spring-biasing force of the coil spring 214 is determined to be slightly weaker than the attracting force of the magnet 212 in the chucking operation, whereby upon non-chucking the annular-shaped disc pushing portion 215 of the movable member 216 is projected from the attracted surface 29a of the flange portion 29 by a predetermined length by the spring-biasing force of the coil spring 214 as shown in FIG. 5.

When the chucking plate 24 is moved downward together with the upper lid 211 in order to effect the chucking, the chucking plate 24 is attracted to the turntable 22 by the magnetic force of the magnet 212. At that time, as shown in FIG. 6, the tip end of the annular-shaped disc pushing portion 215 comes in contact with the top surface of the disc D, and the disc pushing portion 215 is pushed into the middle-diameter cylindrical portion 28 against the spring-biasing force of the coil spring 214. When the chucking operation is finished, as shown in FIG. 7, the disc D is pushed at the innermost peripheral portion of the upper surface thereof by the disc pushing portion 215 and the outer peripheral portion of the disc D adjacent to its innermost peripheral portion is pushed by the flange portion 29. In addition, the spacer sheet 25 attached to the flange portion 29 is brought in close contact with the top surface of the disc D so that, when the magnetic field coil 213 contacts with the top surface of the spacer sheet 25, the recording is effected under the condition that the clearance between the magnetic field coil 213 and the disc D is kept to be the same as the thickness of the spacer sheet 25.

When the chucking is released after the completion of the recording operation, conversely, the chucking plate 24 and the spacer sheet 25 are moved together upwards under the condition that the disc pushing portion 215 of the movable member 216 is pushed to the disc D by the spring-biasing force of the coil spring 214 as shown in FIG. 6. In other words, the disc pushing portion 215 projects from the attracted surface 29a of the flange portion 29 to cause the turntable 22 to be moved downward relatively and the spacer sheet 25 to be detached from the surface of the disc D.

When the chucking plate 24 is further moved upwards (i.e., more than the maximum projected length of the disc pushing portion 215), as shown in FIG. 5, the disc D is released from being pushed by the disc pushing portion 215.

As shown in FIG. 5, a concave portion 217 and a convex portion 218 are respectively formed on the upper surface of the turntable 22 and on the lower surface of the movable member 216 to center the turntable 22 and the movable member 216. In FIG. 7, reference numeral 219 designates a optical pickup head device.

While the disc chucking device of the magnet type is described in the second embodiment shown in FIGS. 4 to 7, the disc chucking device of this invention is not limited to that disc chucking device of a magnet type.

In the first and second embodiments of the present invention as described above, the spacer sheet is thin so that, when the magneto-optical disc is exchanged, the spacer sheet is easily damaged by external causes, such as, the disc or the like. Further, the magnetic field coil provided through the spacer sheet is easily damaged. In order to improve these defects, a third embodiment of the present invention is made.

Figure 9:
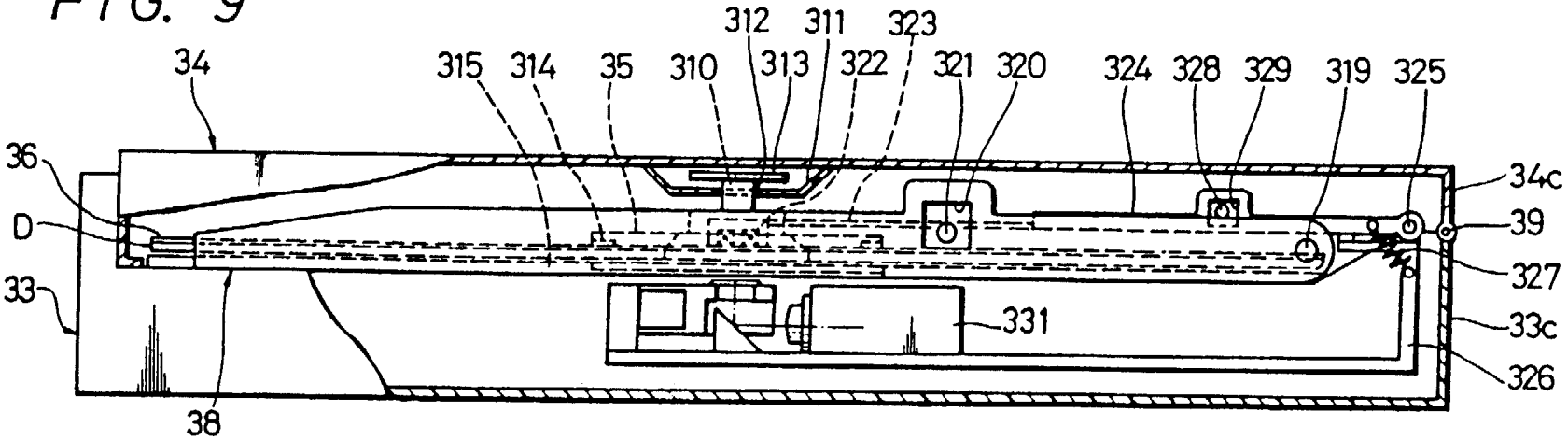
FIG. 9 is a diagrammatic view of a vertical section illustrating an overall arrangement of the third embodiment of the magneto-optical disc recording apparatus according to the present invention, and illustrating the condition that the upper lid of the recording apparatus is closed.
Figure 8:
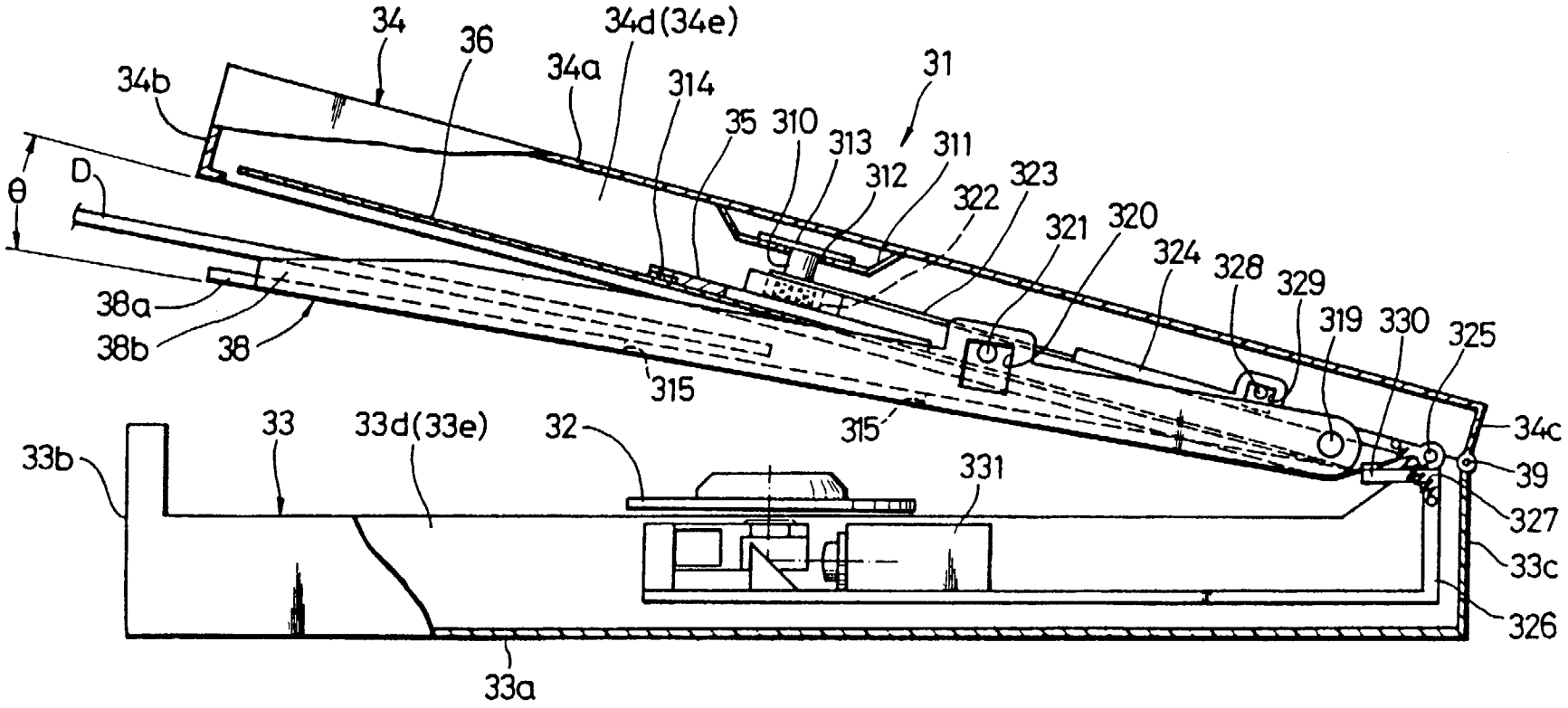
FIG. 8 is a diagrammatic view of a vertical section illustrating an overall arrangement of a third embodiment of the magneto-optical disc recording apparatus according to the present invention, and illustrating the condition that the upper lid of the recording apparatus is opened.
Figure 10:
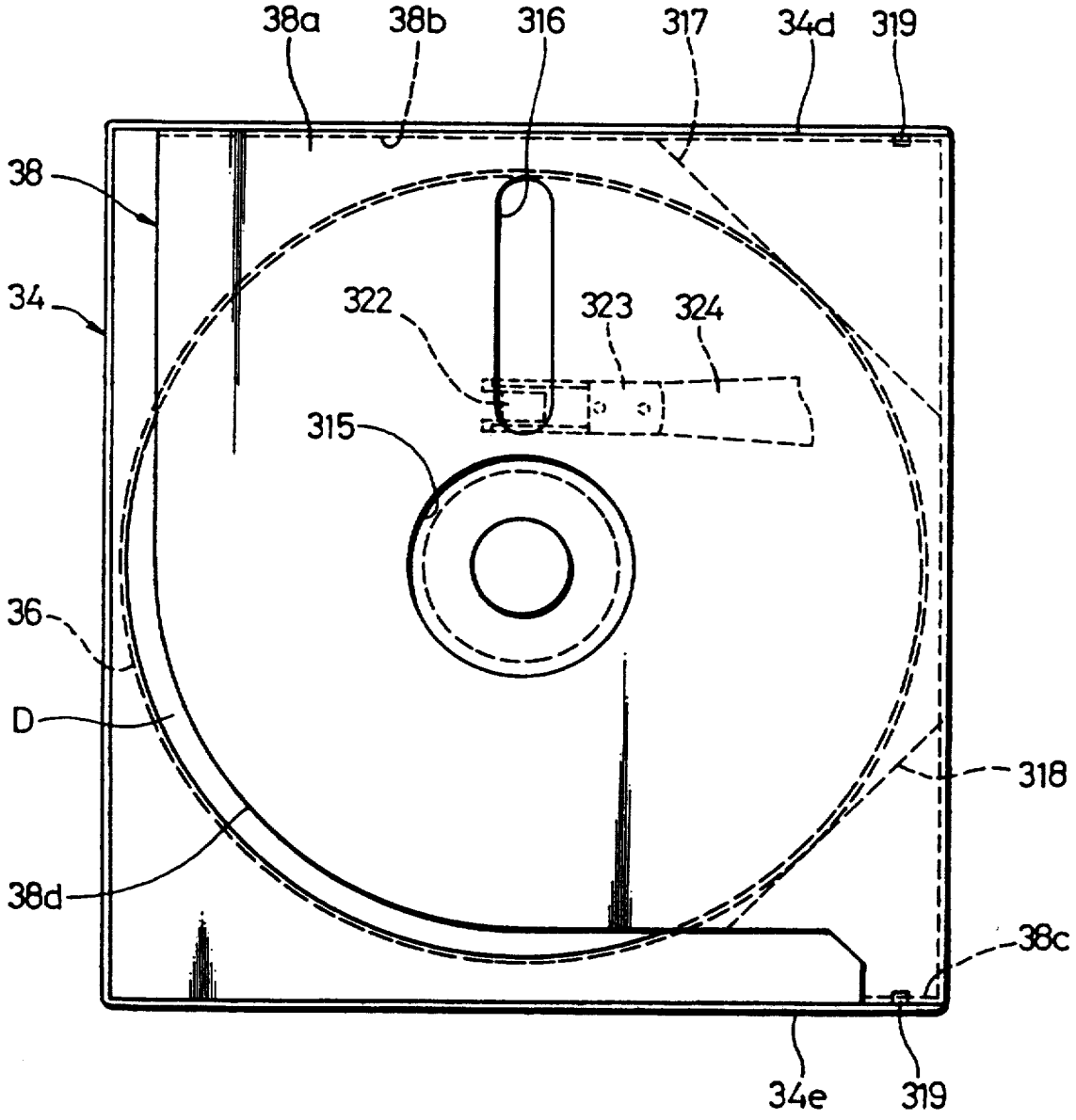
FIG. 10 is a bottom planar view illustrating the upper lid and a disc tray attached to the magneto-optical disc recording apparatus of the present invention.

Let us describe the third embodiment of this invention with reference to FIGS. 8 to 10.

Referring to FIG. 8, there is shown a magneto-optical disc recording apparatus according to the third embodiment of the present invention. In FIG. 8, this magneto-optical recording apparatus is designated by reference numeral 31 and is provided with an apparatus body 33 in which a turntable 32 is provided, an openable and/or closable upper lid 34 attached to the apparatus body 33, a chucking plate 35 mounted on the upper lid 34 and a spacer sheet 36 attached to the chucking plate 35 for controlling the position of the magnetic field coil which will be described later. A disc tray 38 is attached to the upper lid 34 so as to cover the underside of the spacer sheet 36. Accordingly, when the upper lid 34 is opened and/or closed, the disc tray 38 is operated to eject the disc D from and to load the disc D on the turntable 32.

The apparatus body 33 is formed as a rectangular-shaped box with an upper end opened by erecting front, rear, left and right side plates 33b, 33c, 33d and 33e from four end edges of a bottom plate 33a. The turntable 32 is provided at the center portion of such apparatus body 33.

The upper lid 34 is formed as a rectangular-shaped box with a lower end opened by extending downwardly front, rear, left and right side plates 34b, 34c, 34d and 34e from four end edges of an upper plate 34a. The upper lid 34 and the apparatus body 33 form a pair. The lower end of the rear side plate 34c (opposite side to the side from which the disc D is loaded and/or ejected) is pivotally coupled to the upper end edge of the rear side plate 33c of the apparatus body 33 by a shaft 39 so that, when the upper lid 34 is rotated around the shaft 39, the opening portion of the apparatus body 33 is opened and/or closed.

Rotation center shaft 310 is provided at the central portion of the chucking plate 35. This rotation center shaft 310 is engaged with a bearing aperture 312 of a clamp support base 311 provided on the lower surface of the upper plate 34a of the upper lid 34 and secured thereto by a stop member 313, thus shaft 310 and hence the chucking plate 35 are rotatably supported by the upper lid 34. When the upper lid 34 is closed, the chucking plate 35 is attracted to the turntable 32 by the magnetic force of a magnet 314, whereby the disc D loaded on the turntable 32 is pushed to the turntable 32 side, thereby being chucked thereto.

The spacer sheet 36 is formed as a disc-shaped sheet having a thickness of microns by utilizing a non-magnetic high polymer material. The spacer sheet 36 is attached to the attracting surface (under surface) of the chucking plate 35 so that, when the disc D is chucked by the chucking plate 35, the spacer sheet 36 is closely stuck to the upper surface of the disc D.

The disc tray 38 is composed of a bottom plate 38a and left and right side plates 38b and 38c erected from the left and right sides of the bottom plate 38a, as shown in FIG. 10. The disc tray 38 is formed as substantially an unfolded fan wherein one corner portion of the bottom plate 38a is cut-away as an arc surface 38d which has a curvature diameter slightly smaller than the outer diameter of the disc D. Further, the bottom plate 38a has formed therethrough at the central portion thereof a chucking cut-out-window 315 having a diameter larger than that of the turntable 32, and also has formed therethrough in the radius direction thereof a cut-out-window 316 through which a laser beam is irradiated on the disc D. On the respective side portions of the rear upper surface of the bottom plate 38a of the disc tray 38, there are provided a pair of left and right inclined surface portions 317 and 318 which are used to determine the position of the disc D. Owing to these inclined surface portions 317 and 318, the position of the disc D loaded on the bottom plate 38a is determined, and one side of the outer peripheral portion of the disc D is projected from the arc surface 38d of the bottom plate 38a, thereby making it possible to eject the disc D from the disc tray 38 with ease.

In the disc tray 38, one side plate 38b is short and the other side plate 38c is long. Under the condition that these side plates 38b and 38c are overlapped on the inside surfaces of the side plates 34d and 34e, these side plates 38b and 38c are pivotally attached at their rear end portions thereof to the upper lid 34 by the shafts 319 and 319. Also, one side plate 38b has formed therethrough at substantially the central portion thereof in the lengthwise direction a cut-away window 320 by which the disc tray 38 is opened by a predetermined angle $\theta$ relative to the upper lid 34 to enable the disc D to be inserted into the disc tray 38 as shown in FIG. 8. A boss 321 provided on the side plate 34d of the upper lid 34 is inserted into the cut-away window 320 to permit the disc tray 38 to rotate. When the upper lid 34 is opened around the shaft 39 by the predetermined angle $\theta$ relative to the disc tray 38, the boss 321 contacts with the upper edge of the cut-away window 320 formed through the side plate 38b of the disc tray 38, thereby rotating the disc tray 38 together with the upper lid 34.

Then, under the condition that the upper lid 34 is opened and the disc tray 38 is opened by the predetermined angle $\theta$ relative to the upper lid 34, if the disc D is inserted into the disc tray 38 and then the upper lid 34 is closed, the disc tray 38 is moved downwardly together with the upper lid 34 to load the disc D on the turntable 32. Thereafter, the disc tray 38 is inhibited from being rotated from now on by a stopper which will be described later. When the upper lid 34 is further moved downwardly, the spacer sheet 36 is closely stuck to the upper surface of the disc D, and the chucking plate 35 is attracted to the turntable 32 side, thereby clamp ling the disc D. Under this condition, the upper lid 34 is fully closed.

Referring to FIGS. 8 and 9, a magnetic field coil 322 is located above the spacer sheet 36 within the upper lid 34. The magnetic field coil 322 is attached to one end side (tip end side) of a gimbal supporting arm 324 through a gimbal plate spring 323, whereas the other end side (base end side) of the gimbal supporting arm 324 is pivotally supported to a gimbal support arm base 326 by a pivot shaft 325.

The gimbal support arm 324 is spring-biased by a coil spring 327 whose one end is engaged with the gimbal support arm 324 near the pivot shaft 325 and whose other end is engaged to the gimbal support arm base 326 in the counter-clockwise direction in FIG. 8. Thus, when the upper lid 34 is closed, the magnetic field coil 322 slightly contacts with the upper surface of the spacer sheet 36. When the upper lid 34 is opened by an angle more than the predetermined angle $\theta$, a boss 328 formed on one side wall of the upper lid 34 comes in contact with an upper edge of a gimbal supporting arm operating cut-away window 329 formed through one side wall of the gimbal support arm 324 to thereby urge the gimbal supporting arm 324 to be rotated in the clockwise direction in FIG. 8 against the spring-biasing force of the above-described coil spring 327. Thus, the magnetic field coil 322 is spaced apart from the spacer sheet 36 by a very small amount.

In FIG. 8, reference numeral 330 designates a stopper provided on the gimbal supporting arm base 326. This stopper 330 comes in contact with the gimbal supporting arm 324 spring-biased by the coil spring 327, thereby inhibiting the gimbal supporting arm 324 from rotating from any further. In FIGS. 8 and 9, reference numeral 331 designates a photo pickup head device attached on the gimbal supporting arm base 326. The photo pickup head device 331 can be moved in the radial direction of the disc D together with the magnetic field coil 322 by a slide operation mechanism (not shown).

The third embodiment of the magneto-optical disc recording apparatus is constructed as described above so that, when the upper lid 34 is opened, the disc tray 38 is opened by the predetermined angle (in a range of the height of the rotation operating cut-away window 320) relative to the upper lid 34.

Then, if the disc D is inserted into the disc tray 38, the disc D is positioned by the disc positioning inclined surface portions 317 and 318. Under this condition, if the upper lid 34 is closed, then the disc tray 38 is closed together with the upper lid 34 and the disc D in the disc tray 38 is loaded on the turntable 32. Then, after the spacer sheet 36 is closely stuck to the upper surface of the disc D, the disc D is chucked to the turntable 32 by the chucking plate 35, and the magnetic field coil 322 is brought in contact with the top surface of the spacer sheet 36.

While the cut-away window 320 is formed on the disc tray 38 side for rotating the disc tray 38 and the boss 321 is formed on the upper lid 34 side in the third embodiment shown in FIGS. 8 to 10, such a variant is also possible that the boss 321 is formed on the disc tray 38 side and the cut-away window 320 is formed on the upper lid 34 side.

In this case, the opening angle of the disc tray 38 relative to the upper lid 34 may be properly determined by the sizes of the cut-away window 320 and the boss 321.

Furthermore, the construction in which the disc tray 38 is attached to the upper lid 34 is not limited to that of the above-described third embodiment and can be varied freely. For example, any construction may be possible so long as it can protect the spacer sheet 36 when the upper lid 34 is opened.

While the magneto-optical disc recording apparatus utilizing the magnetic field coil as the external magnetic field generating means is described above, it is needless to say that the present invention can be similarly applied to a magneto-optical disc recording apparatus which utilizes a permanent magnet instead of the magnetic field coil.

As set forth above, according to the magneto-optical disc recording apparatus of the present invention, since the magnetic field coil is brought in mechanical contact with the spacer sheet located on the disc to thereby control the position of the magnetic field coil relative to the disc, the magnetic field coil can be located close to the disc without damaging the disc, and the magnetic field coil of the invention can be protected from being affected by the external disturbance caused by the concaved and convexed portion of the disc. Further, the power consumption of the magnetic field coil can be suppressed. In addition, compared to prior art, such devices as the magneto-optical disc recording apparatus of the invention is simple in construction and has fewer assembly parts and fewer portions to be adjusted or the like, which fact is very advantageous for making the apparatus compact in size.

The disc chucking device of the present invention is constructed as described above. According to the disc chucking device of the present invention, upon releasing the chucking operation, the spacer sheet is detached from the surface of the disc while the disc is being urged against the turntable by the disc pushing mechanism. Therefore, it is possible to positively prevent the disc from being projected upon releasing the chucking.

Further, in the magneto-optical disc recording apparatus of the present invention, the disc tray for loading the disc on the turntable and/or ejecting the disc therefrom in association with the opening and/or closing of the upper lid is attached to the disc tray so as to cover the underside of the spacer sheet so that, when the upper lid is opened and/or closed, the ejection and/or loading of the disc, i.e., the disc can be ejected from the turntable and/or loaded thereon by the disc tray with ease. Also, when the upper lid is opened, the above-described disc tray can cover the underside of the spacer sheet, thereby protecting the spacer sheet and the magnetic field coil located at the rear side of the spacer sheet.

Although preferred embodiments of the invention have been described in detail herein with reference to the accompanying drawings, it is to be understood that the invention is not limited to those precise embodiments, and that various changes and modifications may be effected therein by one skilled in the art without departing from the scope or spirit of the novel concepts of the invention as defined in the appended claims.

We claim as our invention:

1. In a magneto-optical disc recording apparatus of the type in which a magneto-optical disc is recorded by irradiating the magneto-optical disc with a recording light from a beam optical pickup head device under the condition that the magneto-optical disc has applied to it an external magnetic field by external magnetic field generating means, the improvement comprising [a spacer sheet to be mounted] *spacer means provided* on the magneto-optical disc wherein the external magnetic field generating means is brought in contact with the spacer [sheet] *means, the spacer means being made of a material which has a smooth surface and a predetermined thickness*

2. A magneto-optical disc recording apparatus according to claim 1, wherein the spacer [sheet] *means* is opposed to the magneto-optical disc on its surface opposite to its surface on which the recording light beam from the optical pickup head device becomes incident.

3. A magneto-optical disc recording apparatus according to claim 1, further comprising spring-biasing means wherein the external magnetic field generating means is spring-biased by the spring-biasing means in the direction in which the external magnetic field generating means comes in contact with the spacer [sheet] *means.*

4. A magneto-optical disc recording apparatus according to claim 1, wherein the spacer [sheet] *means* is formed of a material which has an excellent smooth surface property.

5. A magneto-optical disc recording apparatus according to claim 1, wherein the spacer [sheet] *means* is made of a flexible material so as to become closely conformable to the magneto-optical disc surface opposite to its surface on which the recording light beam from the optical pickup head device becomes incident.

6. A magneto-optical disc recording apparatus according to claim 1, further comprising rotary holding means for rotating the magneto-optical disc under the condition that the magneto-optical disc is held by the rotary holding means, wherein when the magneto-optical disc is held by the rotary holding means, the spacer [sheet] *means* is unitarily rotated together with the magneto-optical disc.

7. A magneto-optical disc recording apparatus according to claim 6, wherein the rotary holding means is comprised of a chucking plate and a turntable, and the spacer [sheet] *means* is secured to the chucking plate.

8. A magneto-optical disc recording apparatus according to claim 6, wherein the rotary holding means includes releasing means for releasing the spacer [sheet] *means* being closely conformed to the magneto-optical disc when the rotary holding means is changed from the magneto-optical disc held state to a non-held state.

9. A magneto-optical disc recording apparatus according to claim 8, wherein the releasing means includes a movable member for moving the magneto-optical disc so that the magneto-optical disc is spaced apart from the spacer [sheet] *means* when the rotary holding means is changed from the magneto-optical disc held state to the non-held state.

10. A magneto-optical disc recording apparatus according to claim 1, further comprising protecting means for protecting the spacer [sheet] *means* when the magneto-optical disc is inserted into [and/or] *and* ejected from the apparatus.

11. A magneto-optical disc recording apparatus according to claim 10, wherein the protecting means is a disc tray for preventing the magneto-optical disc from contacting with the spacer [sheet] *means* when the magneto-optical disc is loaded onto [and/or] *and* ejected from the apparatus.

12. A magneto-optical disc recording apparatus comprising:

an apparatus body including a optical pickup head device for irradiating a magneto-optical disc with a recording light beam under the condition that the magneto-optical disc has an external magnetic field applied to it and rotary drive means for rotating the magneto-optical disc; and a lid including external magnetic field generating means for applying an external magnetic field to the magneto-optical disc, holding means for holding the magneto-optical disc together with the rotary drive means so that the magneto-optical disc can be rotated, and a spacer [sheet] *means* mounted on the magneto-optical disc for controlling the position of the external magnetic field generating means so that a distance between the external magnetic field generating means and the magneto-optical disc becomes constant, the lid being rotatably attached to the apparatus body, and wherein the external magnetic field generating means is brought in contact with the spacer [sheet] *means*

13. A magneto-optical disc recording apparatus according to claim 12, wherein the spacer [sheet] *means* is located on the magneto-optical disc at its surface opposite to its surface on which a recording light from the optical pickup head device becomes incident.

14. A magneto-optical disc recording apparatus according to claim 12, further comprising spring-biasing means wherein the external magnetic field generating means is spring-biased by the spring-biasing means in such a direction that the external magnetic field generating means comes in contact with the spacer [sheet.] *means.*

15. A magneto-optical disc recording apparatus according to claim 12, wherein the spacer [sheet] *means* is formed of a material which has an excellent surface smooth property.

16. A magneto-optical disc recording apparatus according to claim 12, wherein the spacer [sheet] *means* is formed of a flexible material so that the spacer [sheet] *means* can be closely stuck to the magneto-optical disc.

17. A magneto-optical disc recording apparatus according to claim 12, wherein the spacer [sheet] *means* is unitarily rotated with the magneto-optical disc when the magneto-optical disc is held by the rotary drive means and the holding means.

18. A magneto-optical disc recording apparatus according to claim 17, wherein the spacer [sheet] *means* is secured to the holding means.

19. A magneto-optical disc recording apparatus according to claim 12, wherein the holding means includes releasing means for releasing the spacer [sheet] *means* closely stuck to the magneto-optical disc when the holding means is changed from the magneto-optical disc held state to a non-held state.

20. A magneto-optical disc recording apparatus according to claim 19, wherein the releasing means includes a movable member for moving the magneto-optical disc such that the magneto-optical disc is spaced apart from the spacer [sheet] *means* when the holding means is changed from the magneto-optical disc held state to the non-held state.

21. A magneto-optical disc recording apparatus according to claim 12, wherein the lid includes protecting means for protecting the spacer [sheet] *means* when the magneto-optical disc is inserted into [and/or] *and* ejected from the apparatus.

22. A magneto-optical disc recording apparatus according to claim 21, wherein the protecting means is a disc tray for preventing the magneto-optical disc from contacting the spacer [sheet] *means* when the magneto-optical disc is inserted into [and/or] *and* ejected from the apparatus.

23. A magneto-optical disc recording apparatus of the type in which a magneto-optical disc is recorded by irradiating one surface of the magneto-optical disc with a recording light from a beam optical pickup head device under the condition that the magneto-optical disc has applied to it an external magnetic field, wherein the improvement comprises:

an external magnetic field generating means;

a spacer [sheet;] *means;* means for conforming the spacer [sheet] *means* onto a flat surface of the magneto-optical disc which is opposite to the recording light irradiated surface of the magneto-optical disc; and means for bringing the external magnetic field generating means in contact with the spacer [sheet] *means* after the spacer [sheet] *means* is conformed onto the flat surface of the magneto-optical disc.

24. A magneto-optical disc recording apparatus as recited in claim 23 wherein the spacer [sheet] *means* is molded of a smooth, light-weight, non-magnetic, plastic material.

*25. A magneto-optical disc recording apparatus comprising:*

*an optical pickup for radiating a light beam onto a magneto-optical disc and arranged on a first side of the magneto-optical disc;*

*disc driving means for loading the magneto-optical disc and for rotationally driving the magneto-optical disc;*

*an external magneto field generating means for applying an external magneto field and arranged on a second side of the magneto-optical disc; and*

*spacer means provided on the second side of the magneto-optical disc wherein the external magnetic field generating means is brought into contact with said spacer means, said spacer means being made of a material which has a smooth surface and a predetermined thickness.*

*26. A magneto-optical disc recording apparatus according to claim 1, further comprising protecting means for protecting the spacer means when the magneto-optical disc is inserted into the apparatus.*

*27. A magneto-optical disc recording apparatus according to claim 26, wherein the protecting means is a disc tray for preventing the magneto-optical disc from contacting with the spacer means when the magneto-optical disc is loaded onto the apparatus.*

*28. A magneto-optical disc recording apparatus according to claim 12, wherein the lid includes protecting means for protecting the spacer means when the magneto-optical disc is inserted into the apparatus.*

*29. A magneto-optical disc recording apparatus according to claim 28, wherein the protecting means is a disc tray for preventing the magneto-optical disc from contacting the spacer means when the magneto-optical disc is inserted into the apparatus.*

*30. A magneto-optical disc recording apparatus according to claim 1, further comprising protecting means for protecting the spacer means when the magneto-optical disc is ejected from the apparatus.*

*31. A magneto-optical disc recording apparatus according to claim 30, wherein the protecting means is a disc tray for preventing the magneto-optical disc from contacting with the spacer means when the magneto-optical disc is ejected from the apparatus.*

*32. A magneto-optical disc recording apparatus according to claim 12, wherein the lid includes protecting means for protecting the spacer means when the magneto-optical disc is ejected from the apparatus.*

*33. A magneto-optical disc recording apparatus according to claim 32, wherein the protecting means is a disc tray for preventing the magneto-optical disc from contacting the spacer means when the magneto-optical disc is ejected from the apparatus.*

* * * * *